S. LEBOW.
DEVICE FOR SMOOTHING AND SIZING PIPE.
APPLICATION FILED APR. 23, 1919.

1,312,333.

Patented Aug. 5, 1919.

INVENTOR

UNITED STATES PATENT OFFICE.

SIMON LEBOW, OF BELLAIRE, OHIO.

DEVICE FOR SMOOTHING AND SIZING PIPE.

1,312,333. Specification of Letters Patent. Patented Aug. 5, 1919.

Application filed April 23, 1919. Serial No. 292,222.

*To all whom it may concern:*

Be it known that I, SIMON LEBOW, a citizen of the United States, and resident of Bellaire, in the county of Belmont and State of Ohio, have invented a new and useful Improvement in Devices for Smoothing and Sizing Pipe; and I do hereby declare the following to be a full, clear, and exact description thereof.

My invention relates to a device for smoothing or sizing pipe.

The object of my invention is to provide a simple and efficient device of this character which is durable and strong and adapted to quickly and efficiently remove any imperfections upon the interior walls of pipe, such as blisters, scale or other imperfections, and so give a smooth finished inner wall.

To these ends my invention comprises the novel features hereinafter set forth and claimed.

Figure 1:
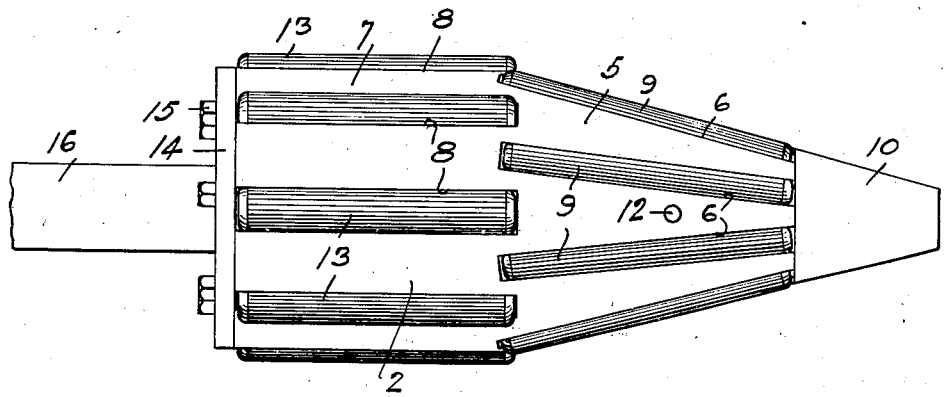
Figure 2:
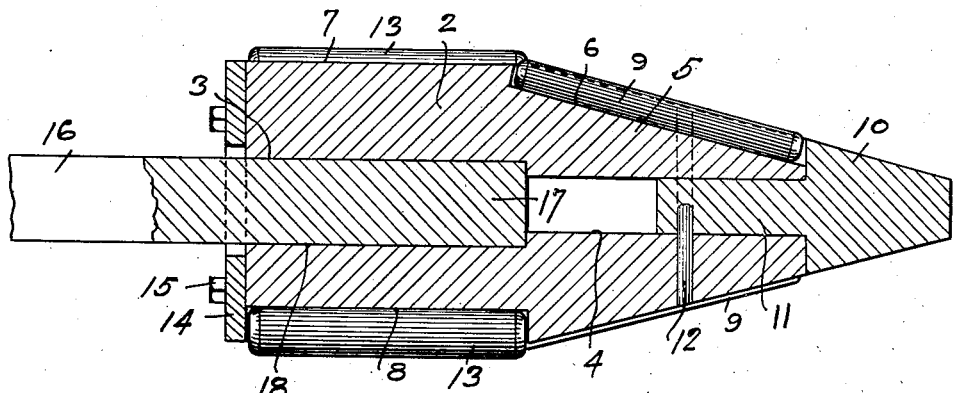
Figure 3:
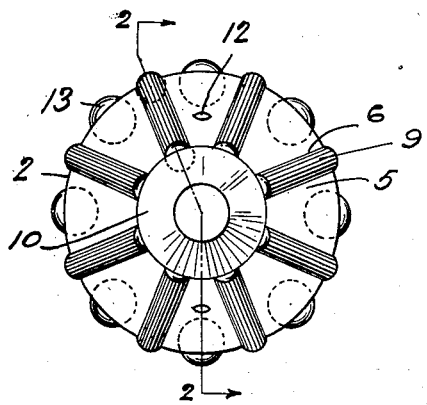

In the accompanying drawing, Figure 1 is a side view of my improved device; Fig. 2 is a section on the line 2—2, Fig. 3; and Fig. 3 is a front view.

In the drawing, the numeral 2 designates the body of the tool which may be formed of cast-iron, said body having the central bores 3 and 4. The body portion is circular in form with the tapered forward portion 5.

Within the tapered portion 5 are the circular seats or grooves 6 arranged at suitable intervals apart. Formed in the straight portion 7 of the body are like circular seats or grooves 8 preferably of larger diameter than the seats 6, and said seats 6 and 8 are staggered with reference to each other.

The rollers 9 formed preferably of steel are inserted in the seats 6, being introduced at the front ends of said seats, and when in said seats, said rollers project beyond the face of the tapered portion 5, as clearly shown in the drawing. When the rollers 9 have been inserted in position, said rollers are held in place by the conical nose or tip 10 which has the shank 11 entering the bore 4. The pin 12 secures the tip in position by passing through the shank 11.

Rollers 13 are inserted in the circular seats 8 in the straight portion 7 of the body, said rollers being inserted from the rear open ends of said seats, and then fitted therein. The rollers are held against slipping from the seats 8 by the plate 14 secured in place by the threaded bolts 15.

The numeral 16 indicates the forward end of a steel-bar which has the square end 17 which enters the square bore 18. This bar is adapted to hold the device stationary in the pipe machine.

When my improved device is in use the rod 16 is held stationary in the machine, and the pipe is advanced on to the tapered end, said pipe turning in the same manner as during a threading operation. If there is any obstruction on the interior of the pipe, such as a blister, dent or other imperfection, this will first come in contact with the rollers 9 and said rollers will be rotated, and will act to press out or remove the imperfection. The pipe then passes on to the straight portion of the body, where the rollers 13 will act to further smooth out and size the interior of the pipe, thereby giving a smooth even finish to the same.

By my invention, I provide a very simple and efficient form of device which will withstand severe strains and usage without getting out of order, while at the same time the rollers act effectively to smooth out and remove any blisters, dents, or other imperfections on the interior of the pipe.

What I claim is:

1. In a device of the character described, the combination of a body having a straight portion and a conical end, longitudinally extending circular seats formed in said straight and conical portions, smooth-faced rollers engaging said seats, and means for holding said rollers in position.

2. In a device of the character described, the combination of a body having a straight portion and a conical end, longitudinally extending circular seats formed in said straight and conical portions, smooth-faced rollers engaging said seats and projecting beyond the same, said rollers on said conical end portion being staggered with reference to the rollers on said straight portion and means for holding said rollers in position.

3. In a device of the character described, the combination of a body having a straight portion and a conical end, longitudinally extending circular seats formed in said straight and conical portions, smooth-faced rollers fitting in said seats, said seats encircling more than one-half of said rollers, and means for holding said rollers in said seats.

4. In a device of the character described, a body having a straight portion and a conical end portion, longitudinally extending circular seats formed in said conical portion, said seats being open at their forward ends, smooth-faced rollers adapted to be inserted into said seats, said seats inclosing more than one-half of said rollers, an end piece secured to said body portion for holding said rollers in position, circular seats formed in said straight portion open at their rear ends, rollers adapted to be inserted in said seats from said rear end, said seats inclosing more than one-half of said rollers, and a plate secured to said body to hold said last-named rollers in position.

5. In a device of the character described, the combination of a body having a straight portion and a conical end portion, longitudinally extending circular seats formed in said conical portion open at their forward ends, smooth-faced rollers adapted to enter said seats from the forward end, said seats closing more than one-half of said rollers, means for holding said rollers in said seats, longitudinally extending circular seats formed in the straight portion of said body open at their rear ends, rollers adapted to enter said seats from the rear ends, said seats inclosing more than one-half of said rollers, and means for securing said last-named rollers in place, said first-named rollers being staggered with relation to said second-named rollers.

In testimony whereof, I, the said SIMON LEBOW, have hereunto set my hand.

SIMON LEBOW.

Witnesses:
 FRANK S. MASON,
 H. W. SCHRAUMM.